(12) United States Patent
Wolczak et al.

(10) Patent No.: US 6,365,297 B1
(45) Date of Patent: Apr. 2, 2002

(54) HIGH-POWER BUSSING CONNECTION SYSTEM FOR A BATTERY PACK

(75) Inventors: Michael C. Wolczak; Christopher E. Schaefer, both of Warren, OH (US); Robert C. Beer, Noblesville; Brad T. Hanauer, Muncie, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/461,852

(22) Filed: Dec. 15, 1999

(51) Int. Cl.⁷ ............................................. H01M 2/02
(52) U.S. Cl. ....................................... 429/159; 429/151
(58) Field of Search .................................. 429/123, 121, 429/151, 152, 160, 157, 158, 159, 178, 153

(56) References Cited

U.S. PATENT DOCUMENTS

| | | | |
|---|---|---|---|
| 4,347,294 A | * 8/1982 | Mejia | 429/151 |
| 5,202,198 A | 4/1993 | Mix et al. | 429/160 |
| 5,558,530 A | 9/1996 | Morello et al. | 439/189 |
| 5,558,545 A | 9/1996 | Staab et al. | 439/762 |
| 5,588,884 A | 12/1996 | Rudoy et al. | 439/845 |
| 5,663,007 A | * 9/1997 | Ikoma et al. | 429/53 |
| 5,663,009 A | * 9/1997 | Stocchiero | 429/65 |
| 5,720,623 A | 2/1998 | Polenick et al. | 439/352 |
| 5,775,930 A | 7/1998 | Model et al. | 439/352 |

* cited by examiner

*Primary Examiner*—Gabrielle Brouillette
*Assistant Examiner*—Monique Wills
(74) *Attorney, Agent, or Firm*—Margaret A. Dobrowitsky

(57) ABSTRACT

A battery pack is provided having at least first and second battery modules, and which in one embodiment has ten modules. Each battery module includes a respective first terminal extending from one end of the module and a respective second terminal extending from the other end of the module. The battery pack further includes a conductive interface having a first opening configured to receive the first terminal of the first battery module and a second opening configured to receive the second terminal of the second battery module to thereby provide an electrical series connection. The interface electrically couples the terminals of the two battery modules. The battery pack may further include an electrically non-conductive buss terminal holder configured to receive and position the first and second battery modules and the conductive interface.

16 Claims, 5 Drawing Sheets

HIGH-POWER BUSSING CONNECTION SYSTEM FOR A BATTERY PACK

BACKGROUND OF THE INVENTION

1. Field of the Invention

This invention relates to a high-power bussing connection system for battery packs.

2. Disclosure of Related Art

A conventional battery pack includes a plurality of battery modules having terminal assemblies disposed at either end of each module. Connections between the battery modules are established by routing cables or wires between the terminal assemblies and by fastening the cables or wires to the terminal assemblies using threaded fasteners, ring terminals or similar fastening devices. The large scale use of individual cables, wires, and fasteners requires a significant amount of assembly time and adds a significant amount of cost to the battery pack Moreover, assembly of the battery pack is relatively unreliable because the electrical connections made with the individual cables, wires, and fasteners are heavily dependent upon human assembly. Finally, the individual cables, wires and fasteners also require a relatively large amount of space in the battery pack and make servicing of the battery pack difficult.

Conventional battery packs have additional drawbacks as well. First, vibration often causes relatively large amounts of movement and stress on the individual battery modules within conventional battery packs. Second, relatively large stacking tolerances are often developed in conventional battery packs as the individual modules are assembled within the battery packs.

There is thus a need for a battery pack that will minimize or eliminate one or more of the above-mentioned deficiencies.

SUMMARY OF THE INVENTION

The present invention provides an improved battery pack.

A battery pack in accordance with the present invention may include at least first and second battery modules each having respective first and second male-type power terminals extending therefrom. For example, in one embodiment, the first terminal of a battery module may correspond to a positive (+) polarity output voltage while the second terminal of the battery module may correspond to a negative (−) polarity output voltage. In accordance with the invention; the battery pack includes a female-type conductive interface having a body portion defining a first opening configured to receive the first terminal of the first battery module and a second opening configured to receive the second terminal of the second battery module (e.g., a positive-to-negative series connection, in one embodiment) wherein the conductive interface electrically couples the first and second terminals of the first and second battery modules forming a series connection.

A battery pack in accordance with the present invention represents a significant improvement relative to conventional battery packs. The inventive battery pack eliminates the need for the large number of wires, cables, and fasteners found in conventional battery packs, thereby making assembly and servicing of inventive battery pack easier and reducing the cost and space requirements of such a battery pack.

A battery pack in accordance with the present invention may also preferably include a buss terminal holder configured to receive the conductive interface. The buss terminal holder may also include means for: (i) aligning, and restricting movement of, the first and second battery modules; (ii) positioning the terminals extending from the first and second battery modules; (iii) coupling the buss terminal holder to other buss terminal holders within the battery pack; and (iv) routing individual wires within the battery pack.

The use of the buss terminal holder within the inventive battery pack results in additional improvements relative to conventional battery packs. The buss terminal holder allows the battery modules within the battery pack to be accurately positioned and secured, thereby minimizing movement and stress on the modules resulting from vibration of the battery pack as well as accommodating tolerance stackups during assembly of the battery pack (i.e., "snap-in" assembly is possible, substantially reducing assembly labor). In addition, the buss terminal holder includes a plurality of cavities configured to receive the respective conductive interfaces. The cavities are sized to permit a predetermined amount of "float" of the conductive interfaces, alleviating or relaxing the otherwise adverse effect of dimensional stack-up tolerance variations.

These and other advantages of this invention will become apparent to one skilled in the art from the following detailed description and the accompanying drawings illustrating features of this invention by way of example.

DETAILED DESCRIPTION OF THE PREFERRED EMBODIMENT

Figure 1A:
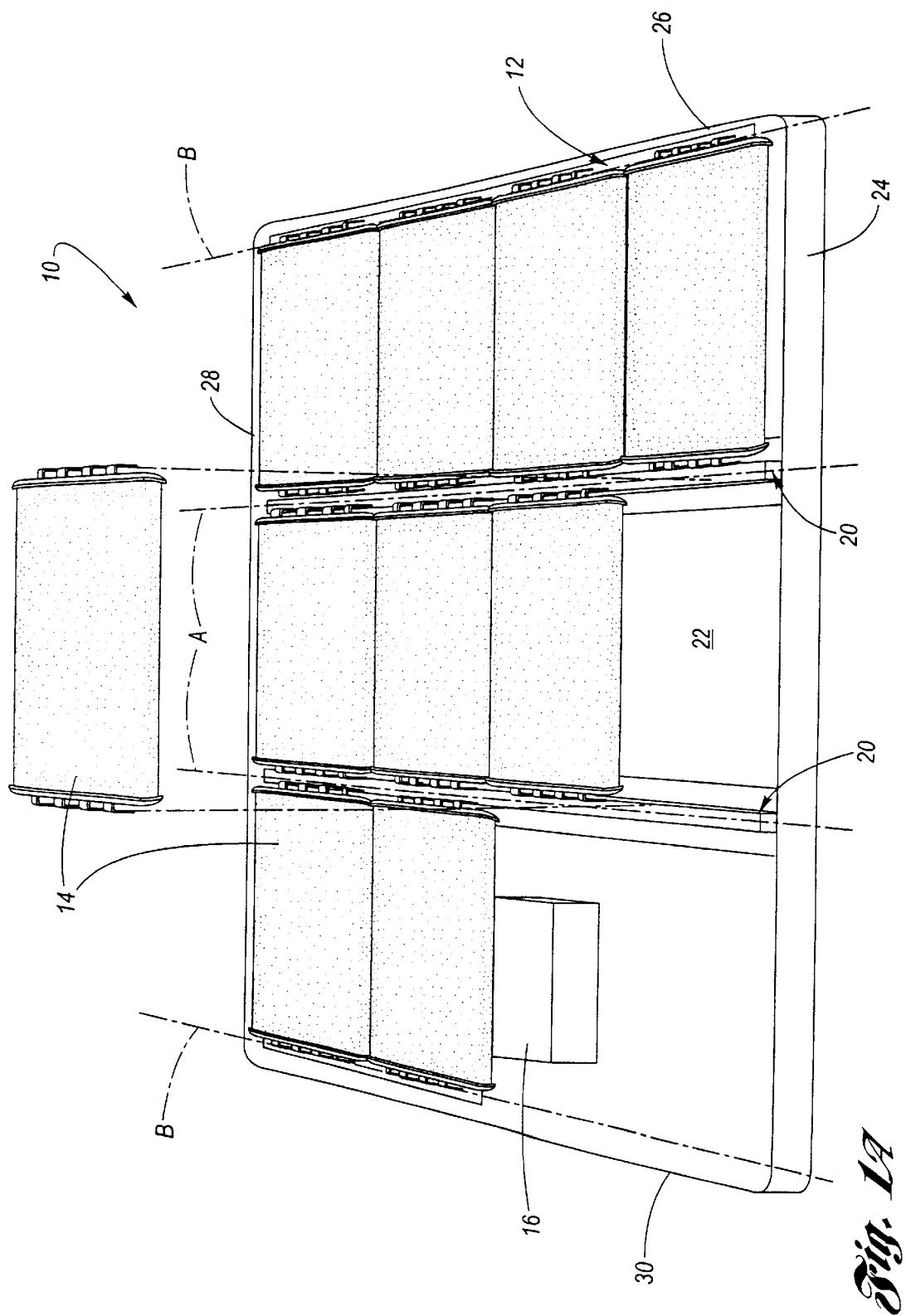
FIG. 1A is a partially exploded, perspective view of a battery pack in accordance with the present invention.

Referring now to the drawings wherein like reference numerals are used to identify identical components in the various views, FIG. 1A illustrates a battery pack 10 in accordance with the present invention. Battery pack 10 may be used to provide power to an electric motor and/or various electrical systems (e.g., lighting systems) in an electric vehicle. It should be understood, however, that battery pack 10 may be used in a wide variety of applications. Battery pack 10 may include a case 12, a plurality of battery modules 14, a controller 16, a plurality of female-type conductive interfaces 18 (shown in FIGS. 3B and 6), and a plurality of buss terminal holders 20.

Case 12 is provided to protect the internal components of battery pack 10 from foreign elements (e.g., water) and objects. Case 12 is also provided to protect individuals and objects external to pack 10 from contact with the internal components of pack 10. Case 12 is conventional in the art and may be made from a wide variety of conventional plastics. Case 12 may include a bottom wall 22 and first, second, third, and fourth side walls 24, 26, 28, 30. Case 12 may also include a top wall or cover (not shown). Case 12 may be molded in a conventional manner to include rails, ledges, and other alignment and air-flow management features to support the internal components of pack 10 and promote air flow between modules 14 of pack 10.

Modules 14 provide power for an electric motor and/or for various electrical systems external to battery pack 10. Each of modules 14 may comprise a lithium-polymer (LiPo) battery module. Alternatively, each of modules 14 may comprise any of a variety of conventional battery modules including nickel-cadmium battery modules and nickel-metal-hydride battery modules. Each of modules 14 may generate approximately 4.2 volts, providing battery pack 10 with a total output of approximately 42 volts when the ten modules 14 illustrated in FIG. 1A are connected in series. The overall positive (+) "terminal" of battery pack 10 will therefore appear on a first battery module 14, while the overall negative (−) "terminal" of battery pack 10 will appear on a second battery module 14. It should be understood, however, that the voltage of individual modules 14 and pack 10 may vary depending on predetermined requirements.

Figure 2:
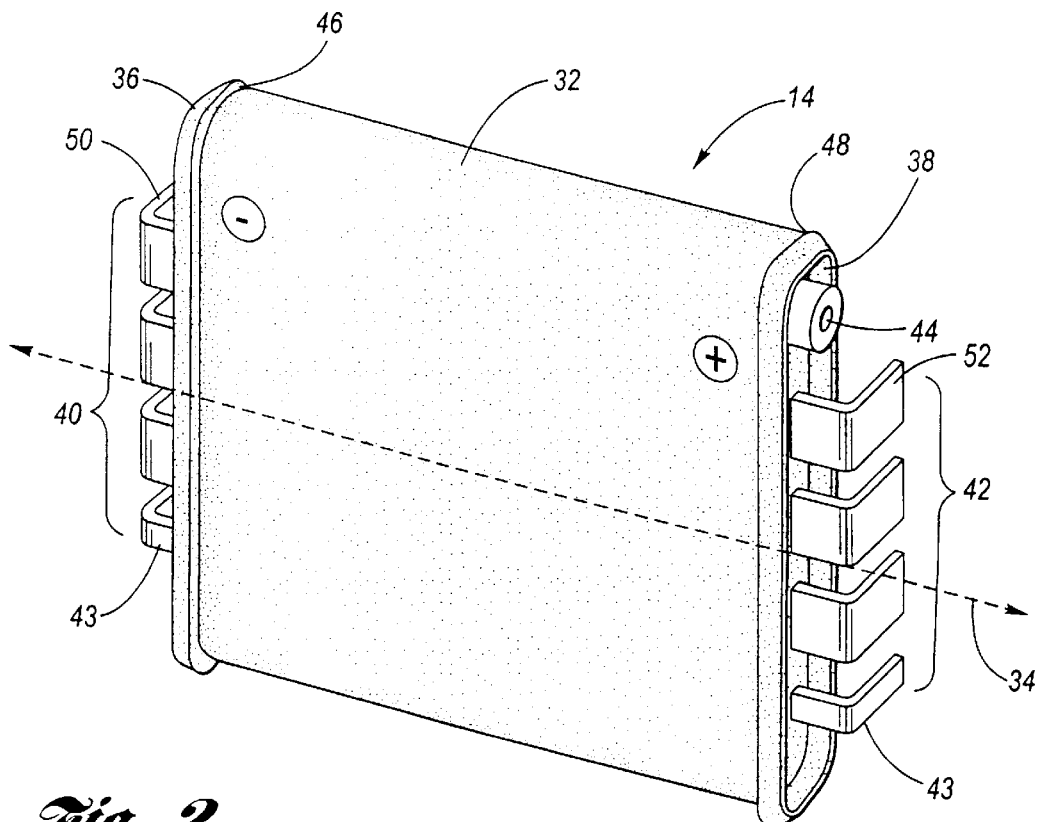
FIG. 2 is a perspective view of a battery module of the battery pack of FIG. 1.

Referring now to FIG. 2, each of battery modules 14 may include a housing 32 extending along a longitudinal axis 34 and a pair of endcaps 36, 38 disposed at either axial end of housing 32.

Housing 32 is provided to protect the internal components of module 14 from foreign objects and elements and to protect individuals and objects external to module 14 from contact with the internal components of module 14. Housing 32 is conventional in the art and may be made from a variety of conventional metals or plastics. Housing 32 extends longitudinally along axis 34 and may be substantially oval in cross-section. It should be understood, however, that housing 32 may assume a variety of shapes.

Endcaps 36, 38 are provided to seal either axial end of housing 32. Each endcap 36, 38 includes a respective power terminal assembly 40, 42. One of the power terminal assemblies 40, 42 is a positive polarity (+) output voltage terminal assembly and the other one of terminal assemblies 40, 42 is a negative polarity (−) output voltage terminal assembly. In addition, endcap 38 may include a conventional fill and/or bleed vent 44. Endcaps 36, 38 may be crimped onto each end of housing 32, forming roll crimps 46, 48, respectively, about the radially outer perimeter of housing 32.

Terminal assemblies 40, 42 are provided to transmit electrical current generated by battery module 14 and are made from an electrically conductive material such as a metal. Each of assemblies 40, 42 may include a body portion with a plurality of fingers that may be bent in a first direction (or a second, opposing direction) to form positive or negative male-type power terminals 50, 52, respectively. Each of terminals 50, 52 may include a first portion extending parallel to axis 34 and a second portion extending in a direction perpendicular to axis 34. The number of terminals 50, 52 may vary depending on the required current output for the application. Also shown as part of terminal assemblies 40, 42 is a respective signal terminal 43, which is used to sense individual cell performance (e.g., voltage).

Referring again to FIG. 1A, controller 16 is provided to monitor the condition of battery modules 14 and to control battery pack 10 responsive to measurements of voltage levels, temperatures, and other parameters within pack 10. Controller 16 is conventional in the art.

The embodiment of battery pack 10 illustrated in FIG. 1A features ten (10) battery modules 14 connected in series. The central connections between battery modules 14, as illustrated along lines designated "A" (in dashed line format), feature the inventive connection system wherein the power terminals of two "end-to-end" battery modules form the connection itself, in combination with conductive interface 18. The "edge" connections between adjacent battery modules 14, such as occur along lines designated "B" in FIG. 1A (in dashed-line format), may be implemented using the power terminals of two "side-by-side" battery modules, multiple conductive interfaces 18, in combination with a buss bar.

Figure 1B:
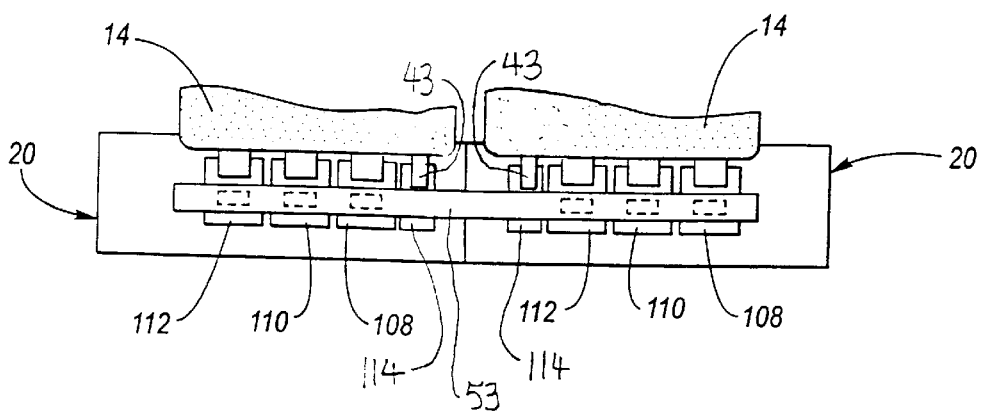
FIG. 1B is a simplified, partial top view of the inventive battery pack, showing in greater detail an edge connection.

FIG. 1B is a partial simplified, top view of an "edge" connection arrangement. FIG. 1B shows a buss bar 53 configured to electrically connect two adjacent modules 14. Note that signal terminals 43 extend somewhat farther out than terminals 50, 52. This allows signal terminals 43 on "end-to-end" connections to "meet in the middle", by passing through a slot 137 (FIG. 6) of cap 88 to connect to a female-type connector.

Figure 1C:
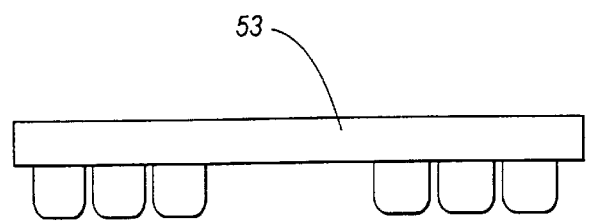
FIG. 1C is a buss bar having a plurality of blades used in the edge connection of FIG. 1B.

FIG. 1C shows a side view of buss bar 53, including a plurality of blade type terminals.

Figure 3A:
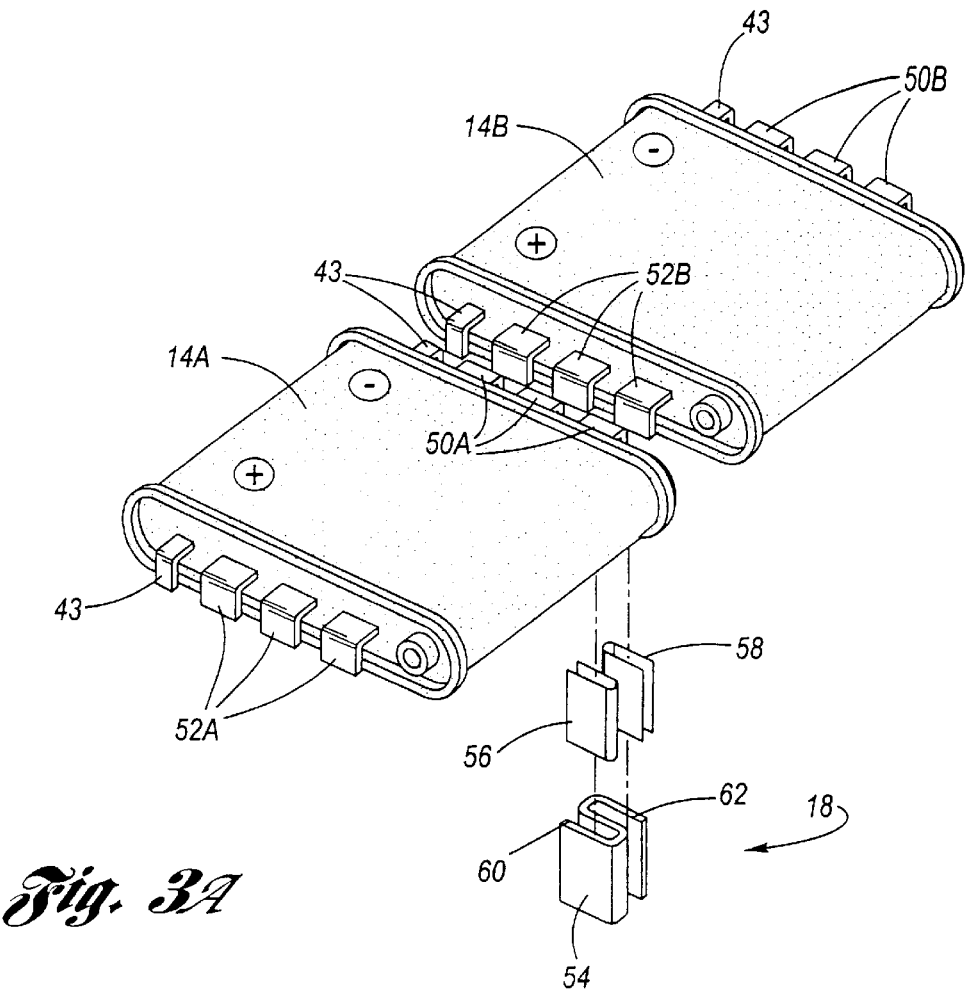
FIG. 3A is an exploded perspective view of the intersection of a pair of battery modules showing a conductive interface of the battery pack of FIG. 1 according to the invention.
Figure 6:
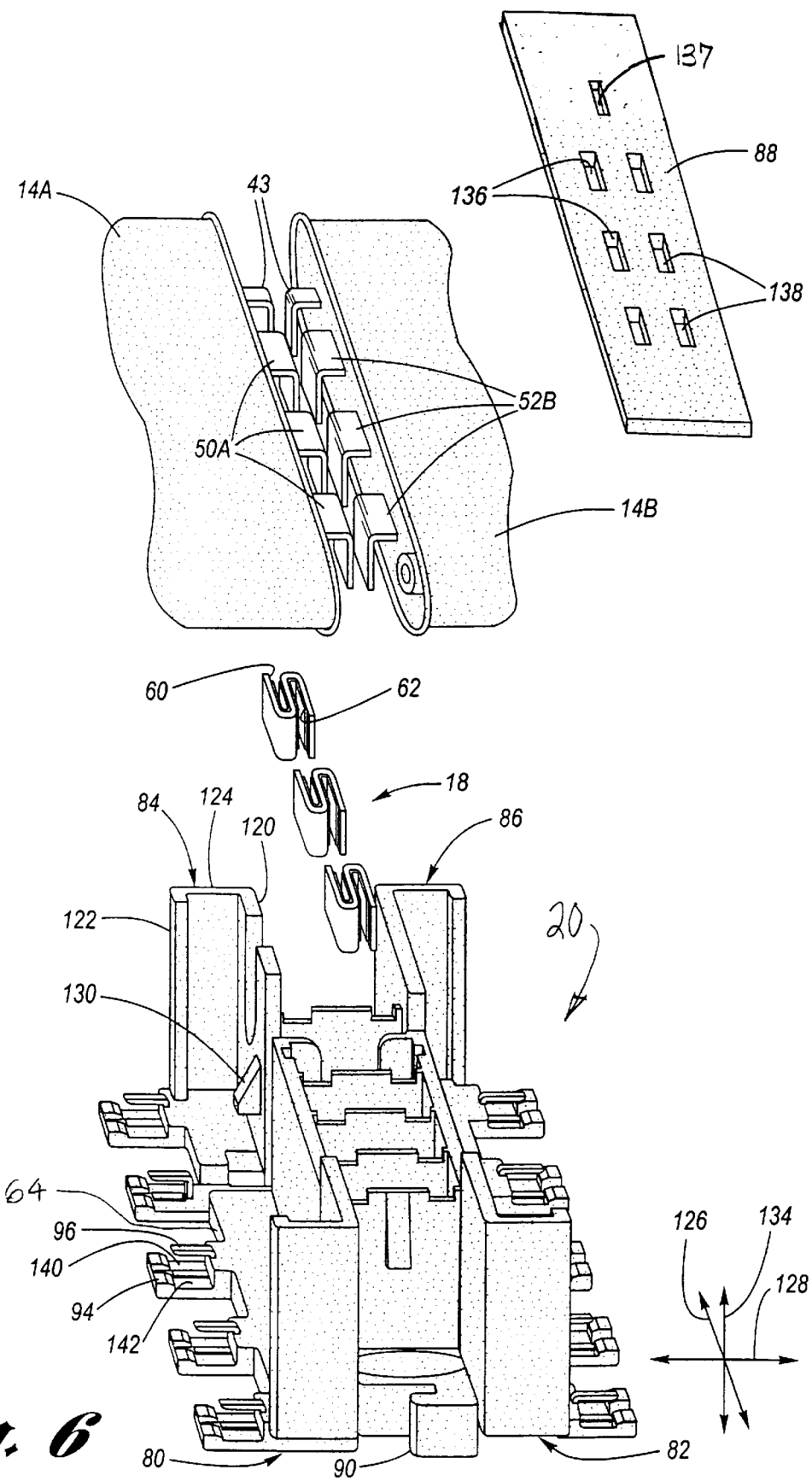
FIG. 6 is an exploded perspective view of the intersection of a pair of battery modules, a plurality of conductive interfaces, and a buss terminal holder in the battery pack of FIG. 1.

Referring now to FIG. 3A, female-type conductive interfaces 18 are provided to electrically couple a pair of battery modules 14, such as modules 14A, 14B, by coupling their respective terminals 50A, 52B. Although only one interface 18 is illustrated in FIG. 3A, it should be understood that each terminal 50A on module 14A may be connected to a corresponding terminal 52B on module 143 using a respective interface 18 (as illustrated in FIG. 6). Each interface 18 may include a body portion 54 and a pair of spring clamps 56, 58 wherein body portion 54 includes openings 60 and 62.

Body portion 54, which may be made from an electrically conductive material, such as copper, nickel plated or silver plated copper, or brass, and may be unitary in construction. First opening 60 and second opening 62 are configured to receive male-type terminals 50A, 522 from modules 14A, 14B, respectively. In the illustrated embodiment, body portion 54 is substantially S-shaped in cross-section. It should be understood, however, that body portion 54 may assume a variety of shapes. Spring clamps 56, 58 are provided secure terminals 50A, 52B within openings 60, 62 of body portion 54. Clamps 56, 58 may comprise conventional components known in the art, and are made from an electrically conductive material such as a metal, more particularly, of louvered, stamped beryllium copper so as to provide not only electrical conductivity, but also provide a suitable level of resilience (i.e., spring action) as well.

The use of interfaces 18 to electrically couple modules 14 within battery pack 10 represents a significant improvement over the prior art. Interfaces 18 eliminate the need for many wires, cables, and fasteners, thereby making assembly and servicing of pack 10 easier. The elimination of the individual wires, cables, and fasteners also reduces the cost and space requirements of pack 10 as compared to conventional batteries.

Figure 3B:
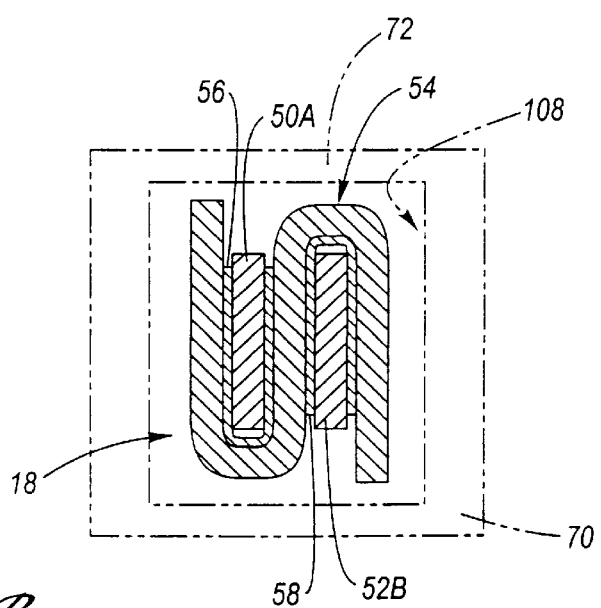
FIG. 3B is a section view of the electrical conductive interface, illustrating a portion of two connected battery modules.

FIG. 3B is a simplified, section view showing the connection of terminal 50A and terminal 52B of "end-to-end" adjacent battery modules 14. As shown, the spring clamps 56 and 58 ensure a reliable connection between battery modules via conductive interface 18. As will be described in greater detail hereinafter, each conductive interface 18 is contained in a cavity (e.g., shown as cavity 108 drawn in phantom line format in FIG. 3B) defined by a plurality of walls (e.g., shown as walls 70, 72 in phantom line format) formed of electrical insulating material. The walls of the cavity constrain movement of the conductive interface, and ensures a reliable, repeatable position of the interfaces 18 for "snap in" simplicity of battery modules 14. It should be noted, however, that the cavities in buss terminal holder 20 are configured to permit a predetermined amount of "float" so as to alleviate adverse effects of dimensional variations of the battery modules 14 (e.g., due to stack-up tolerance variations).

In a constructed embodiment, battery pack 10 is nominally configured to deliver approximately 100 amperes of electrical current. Accordingly, each electrical connection between seriesconnected battery modules has been designed to safely carry that much current (including a predetermined safety of guard margin). Thus, in the illustrated embodiment having three (3) power terminals, each conductive interface is configured to carry, at a minimum, 33⅓ A safely (i.e., 100/3). In a constructed embodiment, each finger/interface was designed to carry 100 A each, for a total capacity of 300 A, even though the cells were configured to deliver 100 A nominally. The actual dimensions used for any particular interface 18 will therefore depend on the expected current (maximum), the selected safety margin, the materials being used, etc., all factors well known to those of ordinary skill in the art.

Figure 4:
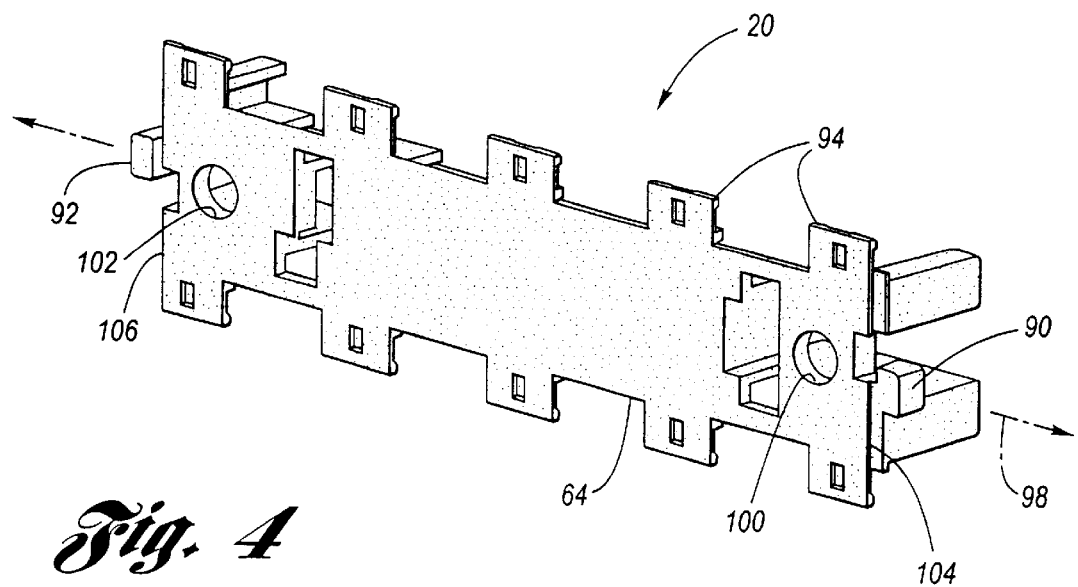
FIGS. 4 and 5 are perspective views of a buss terminal holder in the battery pack of FIG. 1.
Figure 5:
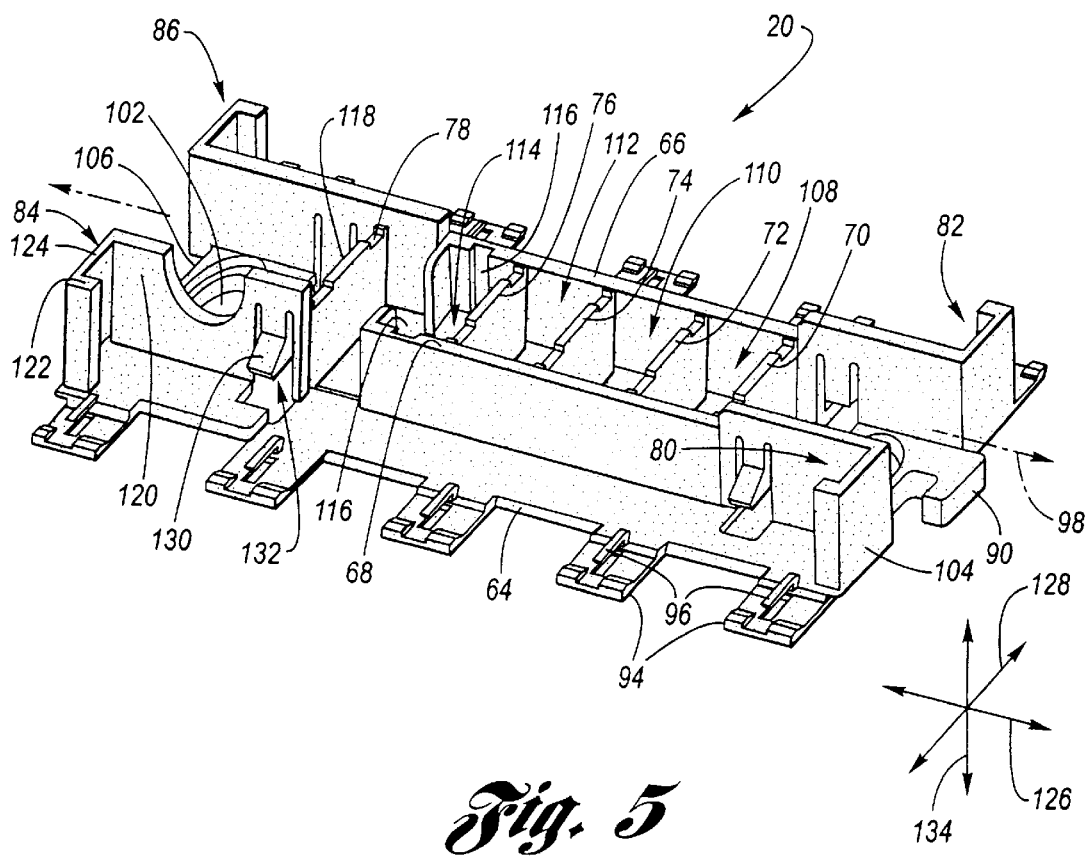

FIGS. 4–6 show buss terminal holder 20 in various views. Buss terminal holder 20 is configured to position and secure modules 14 and interfaces 18 within battery pack 10. Each holder 20 connects two battery modules 14. Holders 20 may be made from a variety of conventional plastics. In one constructed embodiment, holders 20 are made from electrical insulating material. Each holder 20 is configured to receive one or more interfaces 18 and may include a base 64 and a plurality of walls 66, 68, 70, 72, 74, 76, and 78. Each holder 20 may also include: means, such as rails 80, 82, 84, 86, for aligning and restricting the movement of battery modules 14; means, such as cover 88 (best shown in FIG. 6), for positioning terminals 50, 52 extending from modules 14; means, such as interlocking tabs 90, 92, for coupling one buss terminal holder 20 to another buss terminal holder 20 within battery pack 10; and means, such as members 94 and tabs 96, for routing individual wires within battery pack 10.

Referring to FIG. 4, base 64 provides structural support for the other features of holder 20 and extends along a longitudinal axis 98. Base 64 may include apertures 100, 102 disposed proximate either longitudinal end 104, 106, respectively, of base 64. Apertures 100, 102 are provided to align holder 20 within battery pack 10 and may be configured to receive locating members (not shown) extending from case 12 of battery pack 10. Alternatively, apertures 100, 102 may be replaced with rose-bud clips, or fir-tree clips, or another conventional means for securing holder 20 within battery pack 10.

Interlocking tabs 90, 92 are provided to engage mating tabs on other buss terminal holders 20 within battery pack 10. Tabs 90, 92 extend from ends 104, 106, respectively, of base 64 and may be integral with base 64. Each tab 90, 92 is substantially L-shaped in cross-section, having a first portion extending in a direction perpendicular to axis 98 and a second portion extending in a direction parallel to axis 98.

Referring to FIG. 5, walls 66, 68, 70, 72, 74, 76, 78 are configured to define cavities for receiving interfaces 18 and provide an alignment mechanism for cover 88. Walls 66, 68, 70, 72, 74, 76, 78 may be integral with base 64 and extend from base 64 in a direction perpendicular to longitudinal axis 98. Walls 66, 68, 70, 72, 74, 76, 78 define a plurality of cavities 108, 110, 112, 114 with each of cavities 108, 110, 112, 114 configured to receive one of conductive interfaces 18. FIG. 3B shows the walls defining a cavity as shown in phantom line format and, wherein the cavity holds an interface 18. Each of walls 66, 68, 70, 72, 74, 76, 78 may include channels 116 or other features to aid in alignment of interfaces 18 within cavities 108, 110, 112, 114. Each of walls 66, 68, 70, 72, 74, 76, 78 may also include a flange 118 for aligning and retaining cover 88. Cavities 108, 110, and 112 define high current bussing cavities for receiving conductive interfaces 18 to thereby buss the high power terminals of battery modules 14. Cavity 114 defines a signal circuit cavity for receiving, for example, respective signal terminals 43 of battery modules 14.

In the illustrated embodiment, there are two longitudinally extending walls 66, 68 and five laterally extending walls 70, 72, 74, 76, 78. It should be understood, however, that the number of walls may vary depending upon the number of interfaces 18 to be housed within member 20. Lateral wall 78 is longitudinally spaced from the end of walls 66, and 68 to allow a voltage sensing wire (not shown) to be routed into cavity 114.

Rails 80, 82, 84, 86 are disposed at the "four corners" of holder 20 and are provided to align and secure battery modules 14A, 14B and to restrict movement of modules 14A, 14B. Rails 80, 82, 84, 86 may be integral with base 64 and extend from base 64 in a direction perpendicular to axis 98. Rails 80, 82 are disposed proximate end 104 of base 64, while rails 84, 86 are disposed proximate end 106 of base 64. Each of rails 80, 82, 84, 86 may be substantially J-shaped in cross-section, having respective first and second walls 120, 122 extending parallel to axis 98 and a respective third wall 124 extending laterally between walls 120, 122.

Referring to FIG. 6, rails 80, 84 are configured to receive battery module 14A. Rails 82, 86 are configured to receive battery module 14B. Wall 124 of each rail 80, 82, 84, 86 is configured to restrict movement of a respective module 14A, 14B along a first axis 126 while walls 120, 122 of each rail 80, 82, 84, 86 are configured to restrict movement of a respective module 14A, 14B along a second axis 128 perpendicular to axis 126 FIG. 5 shows that wall 120 of each rail 80, 82, 84, 86 may also include an elastically deformable member 130 disposed within a hollow 132 in wall 120. Member 130 may be integral with wall 120 and is configured to restrict movement of a respective module 14A, 14B along a third axis 134 perpendicular to axis 126 and axis 128.

With reference to FIG. 6, module 14A may be inserted into holder 20 be moving module 14A in a direction parallel to axis 134 (downward in FIG. 6). As module 14A is inserted, member 130 deflects inwardly in a direction parallel to axis 128. As crimp 46 of module 14A moves past member 130, member 130 returns to its original position and restricts movement of module 14A along axis 134.

FIG. 6 further shows cover 88, which is provided to retain interfaces 18 and to securely position terminals 50A, 52B of modules 14A, 14B relative to interfaces 18. Cover 88 is also configured to position signal terminals 43. Cover 88 is supported on walls 66, 68, 70, 72, 74, 76, 78 and includes a plurality of slots 136, 138 corresponding to openings 60, 62 of interfaces 18. Cover 88 also includes a slot 137 for receiving signal terminals 43. Cover 88 is installed after interfaces 18/clips 56, 58 have been disposed in the cavities of holder 20 but before installation of battery modules 14.

Slots 136, 138 are thus configured to receive terminals 50A, 52B of modules 14A, 14B, respectively. Slot 137 is configured to receive terminals 43.

Referring to FIGS. 5 and 6, members 94 and tabs 96 are provided to route wires (not shown) within battery pack 10 including wires used to sense voltage levels in modules 14A, 14B. Members 94 extend from base 64 in a direction perpendicular to axis 98 and may be integral with base 64. Members 94 define channels 140 configured to receive one or more wires. Tabs 96 also extend from base 64 in a direction perpendicular to axis 98 and may also be integral with base 64. Tabs 96 are spaced from members 94 and, in particular, from a surface 142 of each member 94 defining a respective channel 140. Tabs 96 may therefore be used to retain wires within channels 140. Individual voltage sensing wires may be attached to a femaletype terminal disposed within cavity 114 (not shown). The femaletype terminal, in one embodiment, is sized to accept two terminals 43. The sensing wires may then be routed from cavity 114, underneath roll crimp 46 of module 14A and through channels 140 of members 94 in one or more buss terminal holders 20. Wires may terminate at a mass-termination connector (not shown) disposed within case 12.

The use of buss terminal holders 20 in a battery pack 10 in accordance with the present invention provides several advantages as compared to conventional batteries. Buss terminal holder 20 allows battery modules 14 within pack 10 to be accurately positioned and secured, thereby minimizing movement and stress on modules 14 resulting from vibration of pack 10 as well as accommodating tolerance stackups during assembly of pack 10.

We claim:

1. A battery pack, including a first battery module and a second battery module, each of said first and second battery modules having respective first and second male power terminals corresponding to one of a positive and negative output voltage polarity, said battery pack including a female conductive interface having a body portions defining a first opening configured to receive said first terminal of said first battery module and a second opening configured to receive said second terminal of said second battery module, said conductive interface electrically coupling said first terminal of said first battery module to said second terminal of said second battery module, wherein said interface includes a first spring clamp disposed within said first opening and a second spring, clamp disposed within said second opening.

2. The battery pack of claim 1 wherein said interface is of unitary construction.

3. The battery pack of claim 1 wherein said interface is substantially S-shaped in cross-section.

4. The battery pack of claim 3 wherein said conductive interface comprises electrically conductive material.

5. The battery pack of claim 1 wherein said first battery module includes a plurality of first terminals and a corresponding plurality of second terminals, said second battery module being substantially identical to said first battery module, wherein said battery pack includes further conductive interfaces so that a total number of interfaces correspond to the number of said first terminals.

6. The battery pack of claim 1, further comprising a buss terminal holder, said buss terminal holder being configured to receive said first conductive interface.

7. The battery pack of claim 6 wherein said buss terminal holder includes:

a base; and, a plurality of walls defining a first current bussing cavity configured in size and shape to receive said conductive interface and permit a predetermined amount of movement of said conductive interface so as to accommodate stack-up tolerances of said battery modules.

8. The battery pack of claim 7 wherein said buss terminal holder includes a cover supported by said plurality of walls, said cover including first and second slots formed therethrough configured to receive said first terminal of said first battery module and said second terminal of said second battery module.

9. The battery pack of claim 6 wherein said buss terminal holder includes a rail configured to receive said first battery module.

10. The battery pack of claim 9 wherein said rail restricts movement of said first battery module along a first axis and along a second axis perpendicular to said first axis.

11. A battery pack, including a first battery module and a second battery module, each of said first and second battery modules having respective first and second male power terminals corresponding to one of a positive and negative output voltage polarity, said battery pack including a female conductive interface having a body portion defining a first opening configured to receive said first terminal of said first battery module and a second opening configured to receive said second terminal of said second battery module, said conductive interface electrically coupling said first terminal of said first battery module to said second terminal of said second battery module, further comprising a buss terminal holder, said buss terminal holder being configured to receive said first conductive interface, wherein said buss terminal holder includes a rail configured to receive said first battery module, wherein said rail restricts movement of said first battery module along a first axis and along a second axis perpendicular to said first axis, wherein said rail includes a deformable member that restricts movement of said first battery module along a third axis, said third axis being perpendicular to said first axis and said second axis.

12. The battery pack of claim 9 wherein said rail includes:

a first wall;

a second wall extending parallel to said first wall;

a third wall connecting said first and second walls; and, an elastically deformable member coupled to said first wall and disposed within a hollow in said first wall.

13. A battery pack, including a first battery module and a second battery module, each of said first and second battery modules having respective first and second male power terminals corresponding to one of a positive and negative output voltage polarity, said battery pack including a female conductive interface having a body portion defining a first opening configured to receive said first terminal of said first battery module and a second opening configured to receive said second terminal of said second battery module, said conductive interface electrically coupling said first terminal of said first battery module to said second terminal of said second battery module, further comprising a buss terminal holder, said buss terminal holder being configured to receive said first conductive interface, wherein said buss terminal holder includes an aperture configured to receive a locating pin to locate buss terminal holder relative to a case.

14. The battery pack of claim 13 wherein said buss terminal holder includes means for routing a first wire within said battery pack.

15. The battery pack of claim 13 wherein said buss terminal holder includes a first interlocking tab, said first interlocking tab configured to engage a second interlocking tab of another buss terminal holder within said battery pack.

16. A battery pack, including a first battery module and a second battery module, each of said first and second battery modules having respective first and second male power terminals corresponding to one of a positive and negative output voltage polarity, said battery pack including a female conductive interface having a body portion defining a first opening configured to receive said first terminal of said first battery module and a second opening configured to receive said second terminal of said second battery module, said conductive interface electrically coupling said first terminal of said first battery module to said second terminal of said second battery module, further comprising a buss terminal holder, said buss terminal holder being configured to receive said first conductive interface, wherein said buss terminal holder includes:

a base; and, a plurality of walls defining a first current bussing cavity configured in size and shape to receive said conductive interface and permit a predetermined amount of movement of said conductive interface so as to accommodate stack-up tolerances of said battery modules, wherein each battery module includes a plurality of first power terminals and a corresponding plurality of second power terminals, each battery module further including a male signal terminal having a size different from said first power terminals and said second power terminals, said buss terminal holder further including a signal circuit cavity having a size different from said first current bussing cavity to thereby establish a polarity indexing system for ensuring proper installation of battery modules.

\* \* \* \* \*